March 14, 1961  P. A. DLUGOSCH  2,974,737
FARM IMPLEMENT CASTER WHEEL

Filed Jan. 3, 1958  3 Sheets-Sheet 1

INVENTOR.
PAUL A. DLUGOSCH
BY
ATTORNEY

March 14, 1961 P. A. DLUGOSCH 2,974,737
FARM IMPLEMENT CASTER WHEEL
Filed Jan. 3, 1958 3 Sheets-Sheet 2

INVENTOR.
PAUL A. DLUGOSCH
BY
ATTORNEY

March 14, 1961 P. A. DLUGOSCH 2,974,737
FARM IMPLEMENT CASTER WHEEL
Filed Jan. 3, 1958 3 Sheets-Sheet 3

INVENTOR.
PAUL A DLUGOSCH
BY
ATTORNEY

2,974,737

FARM IMPLEMENT CASTER WHEEL

Paul A. Dlugosch, Storm Lake, Iowa, assignor to Noble Manufacturing Company, Sac City, Iowa, a corporation of Iowa Filed Jan. 3, 1958, Ser. No. 707,054

3 Claims. (Cl. 172—456)

This invention relates to farm implements and particularly to the arrangement wherein a multi-section ground working implement, such as a spike-tooth harrow, is mounted to a drawbar which is in turn pivotally mounted to a tractor-towed transport carrier. By utilizing the hydraulic system of the tractor, the transport carrier is capable of pivotally rotating the drawbar whereby to raise the harrow sections above the ground for various field and transport operations.

More specifically, the invention is directed to the utilization of so called wing sections of harrow in addition to the usual center sections, wherein the lateral extent of the drawbar is such that wheel assemblies need be attached to each outer end of the drawbar in order to provide proper directional movement or draft of the drawbar outer ends and their attached wing sections of harrow. Additional to the provision of the wheel assemblies for effective field operation of all the harrow sections, their effective use is also necessary during transport of the harrow sections wherein the wing sections are folded rearwardly of center sections so as to permit rapid movement of the implement over roads, through conventional gates, etc.

Thus, it is an object of this invention to provide a wheel assembly of an oscillating or caster type for attachment to each outer end of a drawbar to which ground working implements are attached and wherein the drawbar itself is pivotally connected to a tractor-towed transport carrier.

Another object of this invention is to provide a wheel assembly of the type and for the use mentioned above which is capable of following properly and maintaining the direction of draft as determined by the tractor whereby to ensure proper effectiveness particularly of the outer sections of the ground working implement.

Yet another object of this invention is to provide a wheel assembly of the type and for the use mentioned above which includes structure capable of moving longitudinally and circumferentially of the drawbar whereby to provide for adjusting the height of the outer end or wing portion of the drawbar relative to the tractor or center portion thereof.

A further object of this invention is to provide a wheel assembly of the type and for the use mentioned above which includes structure permitting a forty-five or a ninety degree pivotal rotation of the drawbar without affecting the effectiveness of the wheel assembly as a unit.

Another object of this invention is to provide a pair of wheel assemblies of the type and for the use mentioned above wherein during transport, the wing harrow sections trail correctly at all times without whipping or wobbling and stay in line while turning, and wherein further the wheel assemblies are not directly connected.

Yet another object of this invention is to provide a pair of wheel assemblies of the type and purpose mentioned above which are capable of attaining the objectives noted, each of which is of simple and rugged construction, of economical manufacture, and of effective service and easy maintenance.

These and other objects will become readily apparent by reference to the following description and the accompanying illustrations, wherein.

Figure 1:
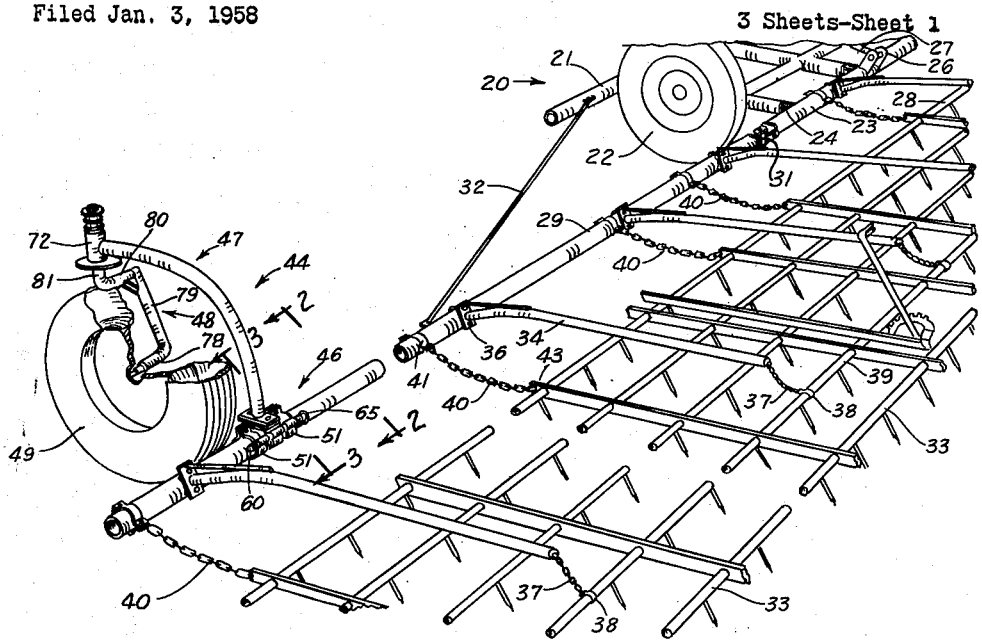
Fig. 1 is a fragmentary perspective view of a portion of a multi-section harrow implement pulled by a tractor drawn transport carrier and disclosing the caster wheel assembly of this invention in assembly relation with the implement, with parts broken away for clarity.

Referring now to the drawings, a tractor 19 is shown having attached thereto a transport carrier 20 which includes a frame 21 mounted on ground engaging wheels 22 (only one of which is shown). A center drawbar 23 is pivotally connected to a plurality of connecting yokes mounted at the rear of the frame 21 and has secured thereto a pair of rock arms 26 to which a lift arm 27 is pivotally connected. One or more center harrow sections 28 are detachably connected to the center drawbar 23 in a manner hereinafter described. The lift arm 27 is pivotally connected to hydraulic lift means (not shown) mounted on the transport carrier 20 and hydraulically actuated between hydraulic system of the tractor 19, whereby to pull the lift arm 27 in a forward and upward direction thus to pivotally rotate, through the rock arms 26, the center drawbar 23 about the pivotal connection thereof at the connecting yokes 24. The movement of the center drawbar 23 is such as to lift the center harrow sections 28 from their ground engaging position to an elevated position thereover.

As the above generally described structure comprises the subject matter of my copending application, for a better understanding thereof, reference may be made to such application, entitled Farm Implement Transport Carrier, Serial No. 207,053, filed January 3, 1958.

For the purpose of adding additional harrow sections to the center harrow sections 28, a pair of extension drawbars 29 are pivotally connected by means of a double universal joint 31 to each end of the center drawbar 23. As the remainder of the description is identical for both extension drawbars 29, only one drawbar 29 and the attached parts will be described, with like parts being indicated by like reference numerals.

For pulling purposes, a cable 32 is connected between a portion of the frame 21 and on outer end of the extension drawbar 29. Wing sections 33 of the harrow are secured to the extension drawbar 29 for lifting purposes by means of lift or riser arms 34, each of which is connected at one end to the drawbar 29, as by a movable clamp bracket 36 and at the other end by means of a chain 37 and a clamp 38 to a portion 39 of a wing section 33. For pulling purposes, a chain 40 is secured at one end to a clamp 41, movable on the drawbar 29, and at the other end to a portion 43 of a wing section 33.

In order to maintain the extension drawbar 29 in proper draft and height relation relative to the center drawbar 23, an oscillating or caster wheel assembly, 44 for the left side of the harrow sections and 45 for the right side thereof, is mounted to the outer end of the extension drawbar 29. The wheel assembly 44 (Figs. 1 and 2) includes a clutch unit 46 mounted to the drawbar 29, a caster frame unit 47 mounted to the clutch unit 46, a caster spindle unit 48 resiliently mounted to the outer end of the caster frame unit 47, and a ground engaging wheel 49 rotatably mounted to the lower end of the caster spindle unit.

The clutch unit 46 includes a pair of clutch stop groups 51 mounted in spaced relation on the drawbar 29 and on each side of a clutch bearing group 52. Each unit 51 (Figs. 2 and 3) includes a split ring 53 encircling the drawbar 29 and having a pair of clamping ears 54 formed thereon whereby the ring 53 may be clamped about the drawbar 29 by means of a bolt 56 inserted through openings (not shown) provided therefor in the ears 54 and held thereto by a nut 57. A clutch pin lock housing 55 of a tubular type is secured on an outer side of the split ring 53, and a stop lug 58 is also secured to the split ring 53 on an outer side thereof opposite the lock housing 55.

The clutch bearing group 52 (Figs. 2 and 3) includes a tubular bearing 61 encircling the drawbar 29 between the split rings 53. A channel member 62 is securely mounted in an inverted manner on top of the bearing tube 61 and has secured thereto a flat caster plate 63. A clutch pin lock housing 64 is secured to one side of the bearing tube 61 and is adapted to be transversely aligned with the lock housings 55 of the stop groups 51, whereby the lock housings 64 and 55, 55 may be locked together by the insertion therethrough of a lock pin 65 (Fig. 1). A stop lug 66 is secured to a side of the bearing tube 61 arcuately adjacent the lock housing 64.

Figure 2:
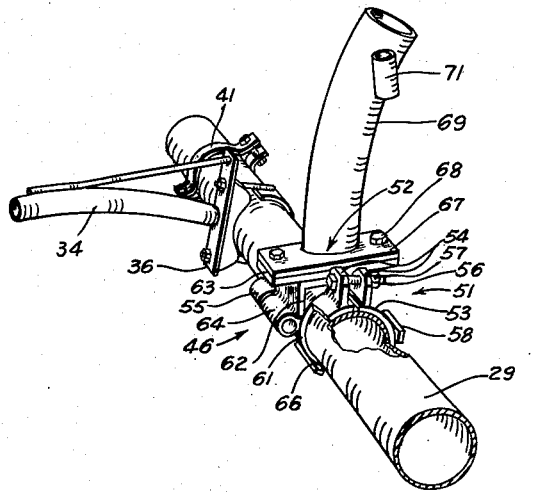
Fig. 2 is an enlarged fragmentary perspective view of the clutch unit of the wheel assembly as seen from the line 2—2 in Fig. 1, with parts broken away for clarity.

The caster frame unit 47 includes a flat frame plate 67 mounted on top of and secured to the caster plate 63 as by bolts 68. A wheel arm 69, preferably of tubular steel, is secured at one end to the frame plate 67 and extends in a curved manner upwardly and forwardly of the drawbar 29 (Fig. 1), and has a substantially vertically disposed bearing housing 72 (Fig. 12) secured at the outer free end thereof. A tubular holder 71 for the lock pin 65 is secured to a side of the wheel arm 69 at a convenient location (Fig. 2).

Figure 12:
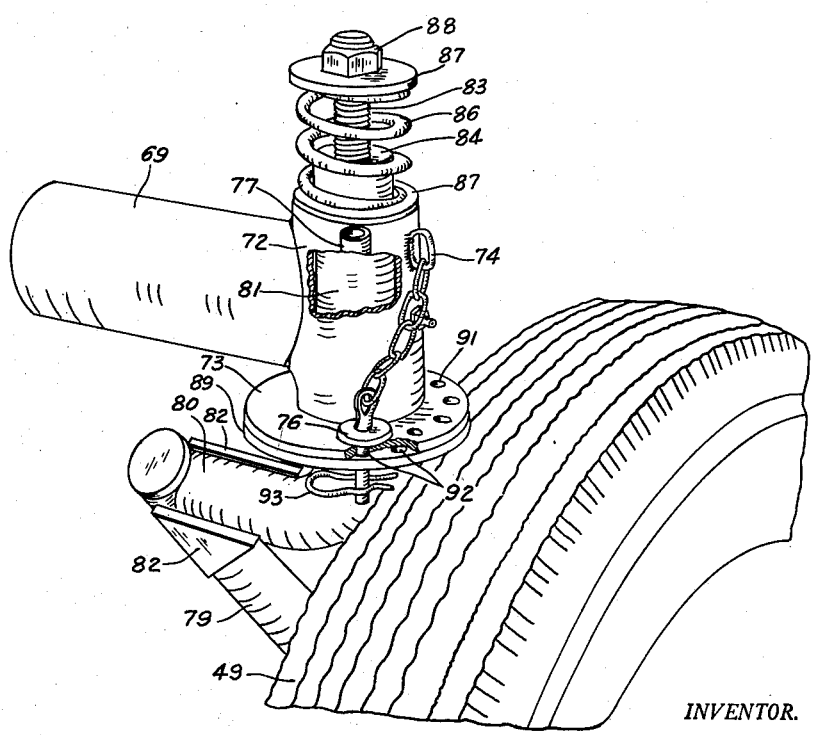
Fig. 12 is an enlarged fragmentary perspective view of a portion of the caster wheel assembly of this invention.

Referring now to Fig. 12, a circular upper adjusting plate 73 is secured to the lower end of the bearing housing 72, and a chain 74 having a pin 76 connected at one end thereof is secured at the other end to the bearing housing 72. A tubular holder 77 for the pin 76 is mounted on an outer surface of the bearing housing 72 at a convenient location.

The caster spindle unit 48 (Figs. 1 and 12) includes a lower substantially horizontal spindle arm or axle 78, adapted at one end to be mounted in the axle housing of the wheel 49, and integral at the other end with an arm 79, extended at substantially right angles to the lower arm 78. An upper spindle arm 80, disposed in a substantially horizontal manner, is secured at one end to the upstanding arm 79, as by a pair of gussets 82 and is integral with an arm 81, the latter arm being substantially vertically disposed and at right angles to the arm 80. A threaded portion 82 of substantially smaller diameter than the arm 81 is formed at the upper end thereof, whereby a shoulder 84 is formed therebetween.

A lower adjusting plate 89 (Fig. 12) is secured about the arm 81 adjacent the base thereof, whereby upon the arm 81 and the housing 72 being assembled, the plates 73 and 89 are contiguous and the shoulder 84 and the threaded portion 83 extend above the upper end of the housing 72. A shock absorbing spring 86 is inserted under compression between a pair of bushings 87—87, the lower bushing 87 being mounted on the upper surface of the housing 72, and the upper bushing 87 being held in place by a nut 88 secured to the top of the threaded portion 83.

For the purpose of locking the frame unit 47 to the spindle unit 49, during transport of the harrow implement, the upper plate 73 is provided with a plurality of arcuately spaced holes 91, each pair of holes being spaced approximately thirty degrees. The lower adjusting plate 89 is also provided with a plurality of arcuately spaced holes 92, each pair of holes 92 being spaced approximately twenty-eight degrees. The adjusting plates 73 and 89 may thus be locked against relative movement therebetween by means of the pin 76 being inserted through a pair of aligned holes 91 and 92, and held thereby, as by a cotter pin 93.

In use, the purpose of the clutch unit 46, comprising the clutch stop group 51 and the clutch bearing group 52, is to enable a longitudinal and circumferential adjustable movement of the wheel assembly 44 relative to the drawbar 29 whereby to provide for proper positioning of the wheel assembly and for proper height adjustment of the drawbar 29.

Thus, by loosening the split rings 53 from their clamped engagement on the drawbar, and as the bearing tube 61 has a slip fit thereon, the entire unit 46 may be moved longitudinally and circumferentially of the drawbar.

Figure 3:
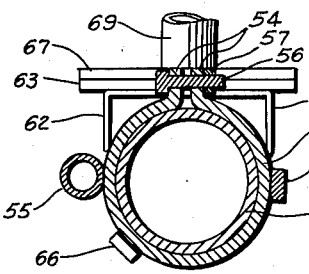
Fig. 3 is an enlarged fragmentary sectional view taken along the line 3—3 of Fig. 1 and showing the relative positions of the parts when the implement is in a ground working position.
Figure 4:
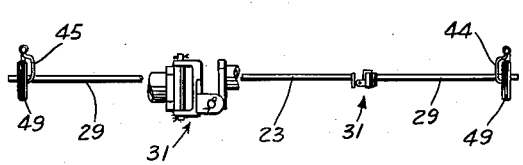
Fig. 4 is a reduced front elevational view of pertinent parts according to the position of the implement as in Fig. 3, one double universal joint being enlarged in the view for clarity.

For ordinary field operations, the clutch lock pin 65 is maintained in its locked position within the lock housings 55, 55 and 64, wherein the relationship of the parts in cross section is best shown in Fig. 3, Fig. 4 showing the relative straight line of the drawbars 23 and 29—29 when the pins 65 are in place at such time.

Figure 5:
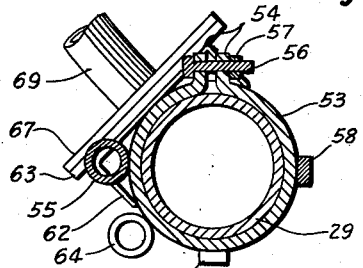
Figs. 5 and 6 are views comparable to Figs. 3 and 4 but wherein the clutch pin has been removed preparatory to the raising of the harrow sections for transportation thereof.
Figure 6:
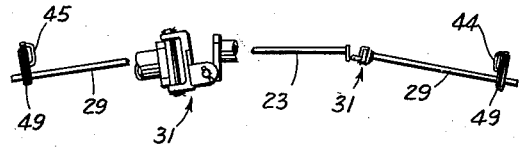

Upon a slight raising of up to forty-five degrees of the harrow sections, the pivotal movement of the drawbar 29 will result in a rearward and upward humping movement of the entire clutch and frame units 46 and 47, respectively. However, when it is desired to raise the harrow sections to approximately ninety degrees off the ground, the pin 65 of necessity must be removed. Figs. 5 and 6 illustrate the resultant flopping of the extension drawbars 29 due to the sagging movement of the now-free clutch bearing group 52 relative to the clutch stop groups 51.

In order, thus, to raise the extension drawbars 29 to a horizontally aligned relation with the center drawbar 23 during transport of the harrow implement, the respective stop lugs 58 and 66 are provided.

Figure 7:
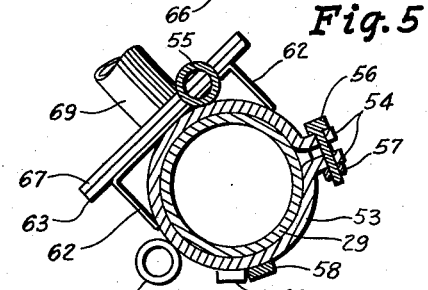
Figs. 7 and 8 are also comparable to Figs. 3 and 4 but wherein the drawbar has been pivoted to raise the harrow sections from their ground engaging position.
Figure 8:
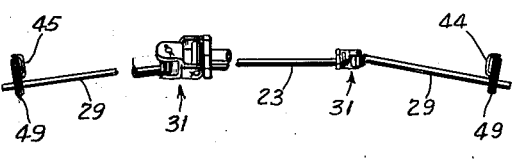
Figure 9:
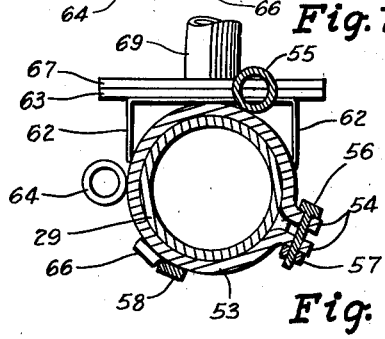
Figs. 9 and 10 are also comparable to Figs. 3 and 4 but wherein the drawbars have been further pivoted to completely raise the harrow sections to their transport position.
Figure 10:
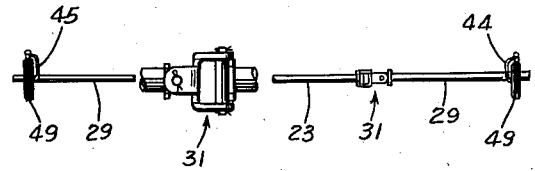
Figure 11:
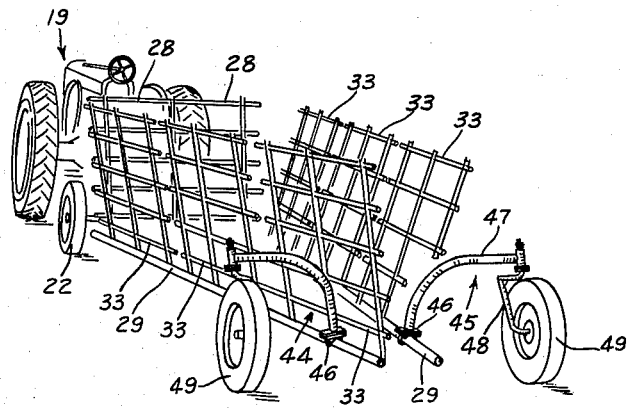
Fig. 11 is a reduced perspective view of the tractor, the transport carrier, and the harrow sections when in transport arrangement, with some parts broken away for clarity.

Referring to Figs. 5 and 7, it is noted that as the drawbar 29 is pivoting in a clockwise manner, whereby to raise the harrow sections, the stop lug 58 of each of the clutch split rings 53 rotates with the drawbar in a lost motion until it contacts the lug 66 of the stationary bearing group 52, at which time the drawbar 29 has rotated partially through the arc necessary to completely raise the harrow sections 33. During the remainder of the rotation of the drawbar 29, as shown in Figs. 7 and 9, the lugs 58 contact and carry with them the lug 66 until the harrow sections are completely raised, at which time the drawbars 23 and 29—29 are again horizontally aligned (Fig. 10). Ths double universal joint 31 is then in proper position whereby the extension drawbars 29 and their respective harrow sections 33 may be swung rearwardly of the center drawbar 23 for transport purposes (Fig. 11).

To lock each wheel 49 with a slight amount of toe-in, thereby forcing the wheels and thus the wing sections of harrow to trail correctly at all times, as mentioned hereinbefore, the wheel assembly frame unit 47 may be locked to the spindle unit 48, thereby preventing relative movement therebetween, by inserting the pin 76 through a pair of aligned holes 91 and 92 formed respectively in the upper and lower adjusting plates 73 and 89. To accommodate different length drawbars, a plurality of holes 91 and 92 are provided, and to provide for more precise and faster variation of toe-in, the lower holes 92 are spaced a lesser distance than the upper holes 92.

As a convenience, when either pin 65 or 76 is not being used, pin holders 71 and 77 respectively are provided therefor.

Although only one embodiment of the invention has been shown and described herein, it is to be noted that various modifications may be made within the full intended scope of the application, as defined by the appended claims.

I claim:

1. In a ground working implement having a center drawbar carried above the ground and having further an extension drawbar connected to the center drawbar, the drawbars being rotatable so as to lift said implement off the ground; a caster wheel assembly for maintaining the extension drawbar in axial alignment with the center drawbar comprising, bearing means mounted for relative movement on the extension drawbar and including a stop member, clamping means mounted on the extension drawbar for movement therewith and including a stop element, means for releasably locking said bearing means and said clamping means together, and frame and spindle means secured to said bearing means and including an oscillatable ground engaging wheel, said stop element, upon rotation of the drawbars during which said locking means is released, is adapted to contact and forcibly rotate said stop member, whereby to maintain the extension drawbar and the center drawbar aligned when the implement is on level ground.

2. In a ground working implement having a center drawbar carried above the ground and having further an extension drawbar connected to the center drawbar, the drawbars being rotatable so as to lift said implement off the ground, a caster wheel assembly for maintaining the extension drawbar in axial alignment with the center drawbar comprising; bearing means mounted for relative movement on the extension drawbar and including a stop member, clamping means mounted on the extension drawbar for movement therewith and including a stop element, means for releasably locking said bearing means and said clamping means together, frame means secured to said bearing means and including an arm member curved away from said bearing means, spindle means including an axle member adjustably connected to said arm member, and a ground engaging wheel rotatably mounted on said axle member, said stop element, upon rotation of the drawbars during which said locking means is released, is adapted to contact and forcibly rotate said stop member, whereby to maintain the extension drawbar and the center drawbar aligned when the implement is on level ground.

3. In a ground working implement having a center drawbar carried above the ground and having further an extension drawbar connected to the center drawbar, the drawbars being rotatable so as to lift said implement off the ground; a caster wheel assembly for maintaining the extension drawbar in axial alignment with the center drawbar when the implement is on level ground comprising, bearing means including a tubular member mounted for relative movement on the extension drawbar, a stop member secured to the tubular member, a pair of clamping units mounted to said extension drawbar for movement therewith each adjacent a side of said tubular member, a stop element secured to each said clamping unit and adapted upon movement of said clamping unit in one direction to contact and forcibly move said stop member and thus said tubular member, and frame and spindle means secured to said bearing means for movement therewith and including an oscillatable ground engaging wheel.

References Cited in the file of this patent

UNITED STATES PATENTS

| 1,927,458 | Klise | Sept. 19, 1933 |
| 2,828,597 | Moore | Apr. 1, 1958 |

FOREIGN PATENTS

| 1,124,097 | France | June 25, 1956 |